Patented Dec. 9, 1947

2,432,332

UNITED STATES PATENT OFFICE 2,432,332

PROCESS OF FACILITATING THE SEPARATION OF ROSIN FROM TALL OIL

Robert C. Palmer, Pensacola, Fla., assignor to Newport Industries, Inc., Pensacola, Fla., a corporation of Delaware No Drawing. Application September 7, 1944,
Serial No. 553,123

8 Claims. (Cl. 260—97.5)

1

This invention relates to a process of facilitating the separation of rosin from tall oil, and more particularly to a process for the separation of rosin from tall oil wherein the fatty acids contained in the tall oil are first reacted to increase their polarity in order to effect a more efficient separation of the rosin acids by means of an adsorbent medium.

In a copending application, Serial No. 551,433 filed August 26, 1944, I have described a process for the separation of rosin acids from fatty acids in admixtures of the two kinds of acids, as for instance in tall oil, by effecting the selective adsorption of the fatty acids by means of adsorbent decolorizing material, and then recovering from the effluent the unadsorbed rosin acids, relatively free from the fatty acids. I have now found that by increasing the polarity of the fatty acids present in the tall oil, as by esterifying the fatty acids with polyhydric alcohols to produce hydroxy compounds, without substantial esterification of the rosin acids, the selective adsorption efficiency in separating rosin acids from the mixture is greatly improved. The conversion of the tall oil fatty acids into compounds having hydroxy groups may be suitably carried out by reaction with a polyhydric alcohol, such as glycerol or one of the glycols, preferably so as to form the monoester of the polyhydric alcohol used. In this way the polarity of the fatty acids is notably increased, whereby a more efficient separation of the rosin acids from the tall oil may be realized.

By the process of my invention it is possible in a simple manner to recover high grade rosin from tall oil. At the same time, the esters of the fatty acids, which are adsorbed by the selective adsorptive action of the adsorbent medium, are recovered after revivification and are useful as substitutes for linseed oil and the like.

It is therefore an important object of this invention to provide a process for facilitating the separation of rosin from admixtures of rosin acids and fatty acids, as found in tall oil, in accordance with which the polarity of the fatty acids is increased by esterifying the same with polyhydric alcohols, whereby a more efficient selective adsorption of the fatty acid component of the tall oil is effected by the use of an adsorbent decolorizing material.

It is a further important object of this invention to provide a process of separating rosin acids from a mixture of rosin and fatty acids by a selective adsorbent action that is rendered more effective by first esterifying the fatty acids in the mixture with polyhydric alcohols without substantially esterifying the rosin acids.

It is a further important object of this invention to provide a process of separating a hard, pale rosin from tall oil by first reacting the fatty acids contained in the tall oil to increase their polarity and then selectively adsorbing the fatty acid reaction product to permit the recovery of a hard, pale rosin, relatively free of fatty acid components.

Other and further important objects of this invention will become apparent from the following description and appended claims.

As the starting material for use in my process, I may employ any commercially available mixture of rosin and fatty acids, but the invention will be described as particularly adapted to tall oil as the starting material. Either a crude tall oil, a refined tall oil substantially free from color bodies and unstable ingredients, oxygenation products and the like, a partially or completely hydrogenated tall oil, or a partially polymerized tall oil may be employed.

Where a pre-refined tall oil is to be used, the pre-refinement may be accomplished by any known means, such as by the employment of adsorbent materials or by the use of selective solvents such as those used in the refining of crude rosin, among the principal ones of which may be mentioned furfural. Pre-refinement of the tall oil may also be accomplished by catalytic treatment or by vacuum distillation, or by heat treatment with or without chemicals that serve to isomerize the rosin acids, or by refinement by chemical treatment that not only purifies but also polymerizes the rosin and/or fatty acids.

In accordance with the principles of my present invention, the tall oil is first subjected to an esterification reaction that is preferably carried only sufficiently far to form the mono-ester of the fatty acids present in the tall oil and thus convert the fatty acids into more polar hydroxy compounds. This result is accomplished by reacting the tall oil with only sufficient glycerol, glycol, or other polyhydric alcohol, to form theoretically the mono-glyceride, the mono-glycol, or mono-ester, of the fatty acids only. My invention is not restricted, however, to the formation of the mono-ester only of the fatty acids, since in actual practice there may be some formation of the di- and tri-esters. The important thing is that only the fatty acids and not the rosin acids, be converted into the more polar hydroxy compounds.

The following examples will serve to illustrate preferred embodiments of my invention, but it will be understood that my invention is not limited to the specific details of these examples. In the examples, parts by weight are expressed, unless otherwise stated.

Example I 100 grams of refined tall oil containing 45.3% rosin acids and 43.3% fatty acids were treated with 14.5 grams of glycerol at 150 to 160° C. for sixteen hours. This amount of glycerol was sufficient theoretically to form the mono-glyceride of the fatty acids only, since the temperature was below that favorable to the esterification of the rosin acids. After the treatment, the reaction product analyzed 37.5% rosin acids, 5.8% fatty acids, and 56.7% esters and unsaponifiables. A solution of this treated material in petroleum naphtha in a concentration of 100 grams of the material per liter of solution was percolated through revivified fuller's earth in a ratio of 4.5 parts of earth to 1 part of the solid partially esterified tall oil. The filtrate from the fuller's earth filtration step was then evaporated to yield a product analyzing 68% of rosin acids, thus showing an increase in rosin acids concentration from 37.5% to 68%. When the same process was applied to untreated tall oil, that is tall oil that had not been partially esterified, the rosin acids content was increased only from 37.5% to 55%.

Example II 100 grams of "press cake" from tall oil which analyzed 71.2% rosin acids and 24% fatty acids were treated with 8 grams of glycerol at 150 to 160° C. for sixteen hours. The partially esterified material in which theoretically only the fatty acids had been converted to mono-glycerides analyzed 65.2% rosin acids and 3.8% fatty acids, with 31% esters and unsaponifiables. This material was then percolated in a solution of petroleum naphtha in a concentration of 100 grams of material per liter of solution through revivified fuller's earth in a ratio of 3½ parts of fuller's earth to one part of solid partially esterified material. The solids were recovered from the filtrate and found to comprise a hard, very pale rosin having an acid value of 174.5 and analyzing 91.8% rosin acids and 2% fatty acids.

Example III 100 grams of tall oil, which analyzed 45.3% rosin acids and 43.3% fatty acids, were treated with 30 grams of ethylene glycol by heating at 125 to 130° C. for sixteen hours. This amount of glycol was theoretically sufficient to form the monoglycol ester of the fatty acids present in the tall oil. Unreacted glycol was removed by steaming. The treated material analyzed 39.4% rosin acids and 9% fatty acids, the balance being largely esters and unsaponifiables. A solution of the partially esterified tall oil in petroleum naphtha was percolated through fuller's earth in the ratio of 6 parts of earth to 1 part of the original unesterified tall oil. The solids material recovered from the filtrate tested 74.3% rosin acids. This was an increase in rosin acid concentration of 35%, whereas the normal rise would not exceed 25% when using unesterified tall oil.

It will be understood that other polyhydric alcohols can be used than glycol and ethylene glycol. Specifically, propylene and 2:3-butylene glycol may be employed. An important feature of my invention is the discovery that by increasing the polarity of the fatty acids present in the mixture of fatty acids and rosin acids, the selective adsorbent action of the adsorbent medium is greatly increased. As stated in my copending application Serial No. 551,433, the ratio of the adsorbent material to combined rosin and fatty acid solids contained in the solution to be percolated through the adsorbent material should be between 3 and 6 parts of adsorbent material to 1 part of such solids by weight. Also as stated in said copending application, at the end of any percolation step, the solution still remaining in the body of the adsorbent medium is displaced with solvent containing no rosin or fatty acid, namely, with a liquid hydrocarbon solvent such as that used in dissolving the mixture of esters and rosin acids at the start of the process. Also, while fuller's earth has been mentioned as the adsorbent medium, other adsorbent decolorizing media may be employed, including the high magnesia type of clays and synthetic magnesium silicates. The high magnesium clays, such as those known under the trade name "Coenite," or chemically prepared magnesium silicates, such as "Magnesol," do not seem to be so efficient as the Florida clays, such as "Floridin." In general, however, any adsorbent medium of the hydrated silicate type may be used, since such adsorbents have been found to possess a selective adsorbent action toward fatty acids, as compared with rosin acids.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. The process of separating rosin acids from a mixture of rosin and higher fatty acids, which comprises partially esterifying a polyhydric alcohol with primarily the fatty acids in said mixture to form a more strongly polar reaction product than the original fatty acids, contacting a petroleum hydrocarbon solution of the resulting mixture of rosin acids and the fatty acid reaction product with an adsorbent medium of the hydrated silicate type in the ratio of at least three parts of said medium to one part of said resulting mixture to effect a selective adsorption of said reaction product and separating the resulting solution containing unadsorbed rosin acids from the adsorbent medium containing the adsorbed reaction product.

2. The process of separating rosin acids from a mixture of rosin and higher fatty acids, which comprises partially esterifying a polyhydric alcohol with the fatty acids without substantially esterifying the rosin acids in said mixture, dissolving the resulting mixture of esterified fatty acids and rosin acids in a petroleum hydrocarbon solvent, filtering the resulting solution through an adsorbent medium of the hydrated silicate type in the ratio of at least three parts of said medium to one part of said resulting mixture and recovering an effluent therefrom containing largely rosin acids.

3. The process of separating rosin acids from a mixture of rosin and higher fatty acids, which comprises partially esterifying a polyhydric alcohol with the fatty acids without substantially esterifying the rosin acids in said mixture, dissolving the resulting mixture of esterified fatty acids and rosin acids in a petroleum naphtha solvent, filtering the resulting solution through an adsorbent medium of the hydrated silicate type in the ratio of at least three parts of said medium to one part of said resulting mixture to effect a selective adsorption of the esterified fatty acids and recovering an effluent therefrom containing largely rosin acids.

4. The process of separating rosin acids from a refined tall oil, which comprises reacting a polyhydric alcohol with the fatty acids of said refined tall oil to convert said fatty acids into esters containing unesterified hydroxy groups without substantially esterifying the rosin acids, dissolving the resulting mixture of esters and rosin acids in a petroleum naphtha, filtering the resulting solution through an adsorbent medium of the hydrated silicate type in the ratio of at least three parts of said medium to one part of said resulting mixture to effect a selective adsorption of said esters, and recovering from the effluent a hard, pale rosin relatively free of fatty acids and esters.

5. The process of separating rosin from tall oil, which comprises reacting a sufficient amount of a polyhydric alcohol with said tall oil to convert the fatty acids therein into esters containing unesterified hydroxy groups without substantial conversion of the rosin acids into corresponding rosin esters, dissolving the resulting reaction mixture in a liquid petroleum hydrocarbon, filtering the resulting solution through a body of fuller's earth in the ratio of at least three parts of fuller's earth to one part by weight of said resulting mixture to effect a selective adsorption of said esters, and recovering from the effluent rosin acids relatively free from fatty acids and their esters.

6. The process of separating rosin from tall oil, which comprises reacting a sufficient amount of glycerol with said tall oil to convert the fatty acids therein into mono-glyceride esters without substantial conversion of the rosin acids into corresponding rosin esters, dissolving the resulting reaction mixture in a liquid petroleum hydrocarbon, filtering the resulting solution through a body of fuller's earth in the ratio of at least three parts of fuller's earth to one part by weight of said resulting mixture, and recovering from the effluent rosin acids relatively free from fatty acids and their esters.

7. The process of separating rosin from tall oil, which comprises reacting a sufficient amount of a glycol with said tall oil to convert the fatty acids therein into mono-esters of glycol without substantial conversion of the rosin acids into corresponding rosin esters, dissolving the resulting mixture in a liquid petroleum hydrocarbon, filtering the resulting solution through a body of fuller's earth in the ratio of at least three parts of fuller's earth to one part by weight of said resulting mixture, and recovering from the effluent rosin acids relatively free from fatty acids and their esters.

8. The process of separating rosin from tall oil, which comprises reacting a sufficient amount of a polyhydric alcohol with said tall oil to convert the fatty acids therein into mono-esters of the polyhydric alcohol used without substantial conversion of the rosin acids into corresponding rosin esters, dissolving the resulting reaction mixture in a liquid petroleum hydrocarbon, percolating the resulting solution through a body of fuller's earth to effect selective adsorption of the fatty acid esters of the polyhydric alcohol employed, and recovering from the effluent rosin acids relatively free from fatty acids and their esters.

ROBERT C. PALMER.

REFERENCES CITED

The following references are of record in the file of this patent:

UNITED STATES PATENTS

| Number | Name | Date |
| --- | --- | --- |
| 2,280,842 | Oliver et al. | Apr. 28, 1942 |
| 2,305,498 | Segessemann | Dec. 15, 1942 |
| 2,240,365 | Dreger | Apr. 29, 1941 |